(12) United States Patent
Johnson (10) Patent No.: US 7,636,914 B1
(45) Date of Patent: Dec. 22, 2009

(54) SYSTEM AND METHOD FOR PROVIDING CONTEXT TO OPERATOR OVERLOADING

(75) Inventor: Steve Johnson, Sudbury, MA (US)

(73) Assignee: The Math Works, Inc., Natick, MA (US)

( * ) Notice: Subject to any disclaimer, the term of this patent is extended or adjusted under 35 U.S.C. 154(b) by 799 days.

(21) Appl. No.: 10/692,524

(22) Filed: Oct. 24, 2003

(51) Int. Cl.
   *G06F 9/44* (2006.01)
   *G06F 9/45* (2006.01)
(52) U.S. Cl. .................. 717/143; 717/144; 717/141; 717/140; 717/114; 717/116; 717/108
(58) Field of Classification Search ......... 717/106–114, 717/116, 138–144; 707/1–3, 100–103 Y
See application file for complete search history.

(56) References Cited

U.S. PATENT DOCUMENTS

| | | | |
|---|---|---|---|
| 2004/0015473 A1* | 1/2004 | Trappen et al. | 707/1 |
| 2004/0015814 A1* | 1/2004 | Trappen et al. | 717/100 |
| 2005/0149914 A1* | 7/2005 | Krapf et al. | 717/136 |

OTHER PUBLICATIONS

Conway, "Parsing with C++ Deferred Expressions," ACM SIGPLAN Notices, vol. 29, No. 9, pp. 9-16, ACM, 1994.*
Walter et al., "boost C++ Libraries uBLAS Overview," copyright 200-2002.*
Bischof et al., "Combining source transformation and operator overloading techniques to compute derivatives for MATLAB programs," IEEE, 2002.*
Miles et al., "Implementing generalized operator overloading," 1998, Wiley & Sons.*

* cited by examiner

*Primary Examiner*—Insun Kang
(74) *Attorney, Agent, or Firm*—Lahive & Cockfield, LLP; Kevin J. Canning (57) ABSTRACT

A method of operator overloading that enables a user of a program development environment to view both the structure of the operands of the operation being overloaded, and also the context in which the operator is being used is disclosed. The present invention utilizes a parse tree created by a language processor. The use of the parse tree, which may be represented as a class, allows the context information to be made available to a class designer. Objects of the parse tree class include methods designed to identify the operator at a root and to retrieve left and right trees. An assignment function is defined which uses two parse tree objects as arguments and performs an indicated mathematical operation based upon the context revealed by the parse tree objects. The assignment function may exist in more than one class and be overloaded. The overloading of the assignment function enables the context within which the mathematical operation is occurring to become visible and be acted upon.

28 Claims, 3 Drawing Sheets

SYSTEM AND METHOD FOR PROVIDING CONTEXT TO OPERATOR OVERLOADING

FIELD OF THE INVENTION

The illustrative embodiment of the present invention relates generally to operator overloading in an object oriented language-based development environment, and more specifically to the providing of context through the use of parse tree information during operator overloading.

BACKGROUND

Objects provide a way for programmers to extend the basic data types in a programming language to provide higher-level data types specific to their application. Objects are also used to package specific tools or capabilities, such as graphical packages or mathematical packages, so that they can be used effectively in larger applications. Objects typically consist of properties or members, which hold data from the basic data types, and may also contain other objects, and methods, functions designed to work specifically on a particular object. Often, Object Oriented Languages (OOLs) will provide a way of overloading the basic operations of the language, including addition, subtraction, multiplication, division, assignment, subscripting, and field reference. Typically, this is done by providing special methods that get invoked when these operators are used on members of the class. For example, if x and y are members of a class C, then if the user writes x+y the class system might invoke the overloaded Plus (x, y)

in response to the '+' operator in order to compute the "sum" of x and y. The Plus function will typically perform some other operations extending, or in place of, the addition operation." (there would be no reason to overload the '+' operator if all that was going to happen was an ordinary addition of the two variables).

Unfortunately, there are many cases when the traditional operator overloading method does not meet user needs. For example, people writing code for an embedded processor frequently must simulate the behavior of computers with unusual instructions and word lengths. Also, speed of execution is frequently critical, so simulating complicated instructions when simple instructions will do is not an acceptable alternative. Finally, programmers may desire more control over the order of operations than is provided by the base language.

Additionally, in conventional object-oriented languages, operator overloading is specified by defining methods in the class that correspond to the operators that are being overloaded. This specification suffers from the deficiencies that the objects that participate in an expression are only processed in pairs, and that there is no opportunity to discover the context in which a given expression appears. As an example, consider y=x+1

If x is a 16-bit variable, but y is only 8 bits wide, then the addition can be done in 8 bits rather than 16. However, the conventional overloading method does not allow information from the left side of the assignment operator to be seen on the right side—the only thing that the overloaded Plus operator sees is x and 1. Put another way, the context in which the operation is occurring is not visible during the mathematical operation.

An additional problem with conventional methods of overloading operators is that the conventional methods have difficulty with complicated instructions. An example is given by x+y*z Some embedded processors have special instructions that will multiply two numbers and add the result into a third (a multiply and accumulate or MAC instruction). It is very difficult in the usual operator overloading paradigms that operate on two operands to recognize and properly simulate MAC instructions.

BRIEF SUMMARY

The illustrative embodiment of the present invention provides a method of operator overloading that enables a class designer to view both the structure of the operands of the operation being overloaded, and also the context in which the operator is being used. The present invention utilizes a parse tree created by a language processor. The use of the parse tree, which is represented as a class, allows the context information to be made available to the class designer. Objects of the parse tree class include methods designed to identify the operator at a root and to retrieve left and right trees. An assignment function is defined which uses two parse tree objects as arguments and performs an indicated mathematical operation based upon the context revealed by the parse tree objects. The assignment function may exist in more than one class and be overloaded. The overloading of the assignment function enables the context within which the mathematical operation is occurring to become visible and be acted upon.

In one embodiment in a program development environment, a method provides a parse tree data structure written in a base language. An assignment function is defined which takes more than one parse tree object as arguments. The assignment function is then called to determine the value of an assignment within the base language or an extension to the base language.

In another embodiment, in a program development environment, a method provides a parse tree data structure written in a base language. An assignment function is defined which takes more than one parse tree object as arguments. The assignment function is then called to determine the value of an assignment within the base language or an extension to the base language. Code is then generated for an embedded processor using the parse tree data structure.

In a different embodiment, in a program development environment, a method provides a parse tree data structure written in a base language. An assignment function is defined which takes more than one parse tree object as arguments. The assignment function is then called to determine the value of an assignment within the base language or an extension to the base language. The parse tree data structure is then used in software emulation.

In an embodiment, a system includes a program development environment having a base language. The system also includes a parse tree data structure which includes methods able to retrieve values for base language objects. An assignment function is also included in the system, the assignment function taking multiple parse tree structures as arguments. The assignment function is called to determine the value of at least one assignment within the base language or an extension to the base language.

In another embodiment, in an object-oriented program development environment having a base language, a method provides a parse tree data structure which is used as the basis for at least one parse tree object. The parse tree object includes methods able to retrieve values for base language objects. An assignment function is defined which takes more than one parse tree structure as arguments in more than one class. The assignment function is then called to determine the value of an assignment within the base language or an extension to the base language. The assignment function is used to overload a mathematical operator based on the context of the parse tree objects.

DETAILED DESCRIPTION

The illustrative embodiment of the present invention provides a class designer the opportunity to overload operators in an object oriented language-based design environment based upon the structure of the operands of the operation being overloaded as well as the context in which the operator is being used. The structure of the operands and the operator context is used by the designer to decide what properties the class should have, and what methods should be provided, and also to implement and test the chosen methods. The present invention enables designers to build classes with a top-down view of operator overloading thus enabling the fashioning of behaviors that would be difficult or impossible to obtain with conventional object-oriented systems.

Figure 1:
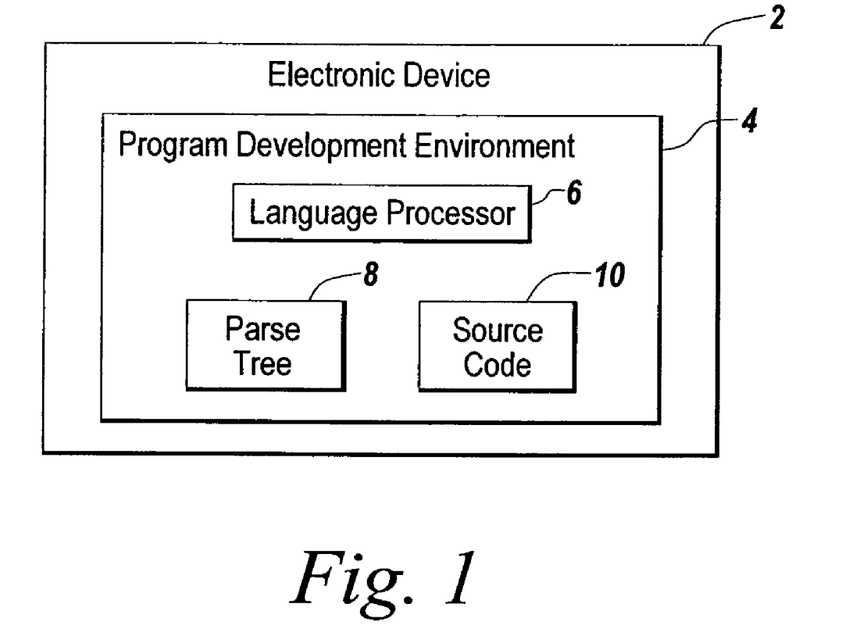
FIG. 1 depicts an environment suitable for practicing the illustrative embodiment of the present invention.

FIG. 1 depicts an environment suitable for practicing the illustrative embodiment of the present invention. The present invention is practiced on an electronic device 2 holding a program development environment 4. The program development environment 4 may be an object-oriented language based environment, or alternatively, may be a non-object-oriented language based environment. For purposes of illustration, the discussion below will focus on an object-oriented implementation. The electronic device 2 may be a desktop, workstation, mainframe, server, PDA, laptop or some other type of electronic device with a processor and a medium holding an object oriented language-based development environment. The program development environment 4 utilizes a Language Processor 6, which, as discussed further below, turns programs written in an object-oriented language such as C++, MATLAB or other object oriented language into a functioning application. The Language Processor 6 is used to build a parse tree 8 data structure from the source code 10 for a computer program written in an object-oriented language. The various methods of building a parse tree with a Language Processor are common knowledge to those skilled in the art, and are discussed at length in textbooks such as *Aho, Sethi & Ullman*, Compilers: Principles, Techniques, and Tools, Addison Wesley, 1986.

A Tree class represents this Parse Tree, whose exact form depends on the Base Language upon which this invention is applied. The illustrative embodiment of the present invention includes the built-in class, called Tree, and associated behavior in the Language Processor 6 that treats this Tree class specially. Class Tree has methods called kind, that tells what kind of an operator is at the root of the tree, and left and right methods that deliver the left and right Trees, if present. When a Tree is simply a constant, methods are available to get the value of the constant. When a Tree is a simple variable, methods are available to get the value of the variable and the associated information about it (for example, its class and size).

Those skilled in the art will recognize that when the program development environment 4 is not object-oriented, parse tree data structures may be built without the use of a class using traditional computer programming data structures familiar to those with a sequential programming background. It will be further appreciated throughout the discussion herein that the examples and illustrations made with reference to an object-oriented programming environment are also applicable to non-object oriented programming environments without departing from the scope of the present invention.

The illustrative embodiment of the present invention may be used during class design by the designer. To use the present invention on a class (referred to herein as class C), the designer must write a function, Assign, based on class C (those skilled in the art will recognize that the name of the function is immaterial to the operation of the present invention). The function Assign takes two Tree objects as arguments and is used by the Language Processor 6. The Language Processor 6 uses the Assign function as follows. Whenever there is an assignment, such as

X=Y

Then the Language Processor 6 calls the Assign function

Assign(t1, t2)

where t1 is the Tree object corresponding to X and t2 is the Tree object corresponding to Y. This function evaluates the value of t2 and assigns the value to the tree object represented by t1. When there is an indexing expression on the left side of an assignment, such as a(i)=Y then the Assign function is called with t1 being the Tree representing the expression a(i) and t2 representing the expression Y. The Tree class also contains special nodes that can be used in contexts where there is no explicit assignment—for example, parameters in a function call or use as a subscript. The exact set of nodes defined for these purposes varies depending upon the details of the Base Language.

For most of the classes built-in to the Base (object-oriented) Language, the value is well-defined and there is no need to specify the Assign function explicitly. The Tree class has a built-in method, called Val that follows the usual rules for obtaining the value of Base Language objects. Other methods of the Tree class may include left ( ), and right ( ) (which return left and right Trees respectively), and getClass( ), and getSize( ) which are used to get the class and size of a variable or tree.

Figure 2:
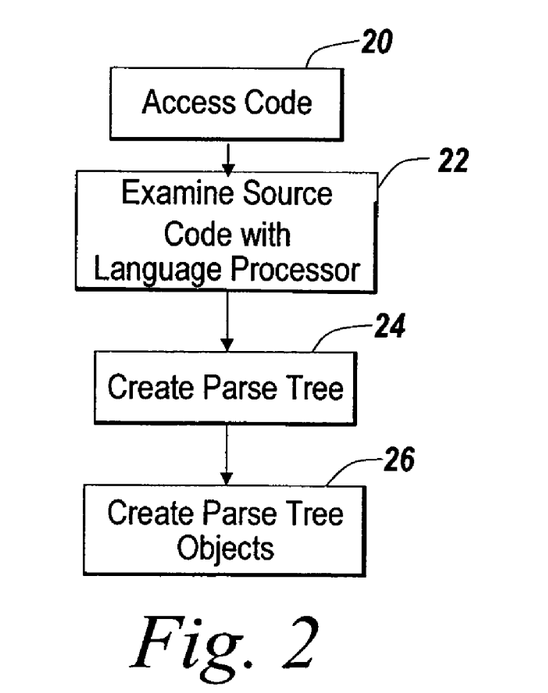
FIG. 2 is a flowchart of the sequence of steps followed by the illustrative embodiment of the present invention to create parse tree objects.

FIG. 2 depicts the sequence of steps followed by the illustrative embodiment of the present invention to utilize the parse tree 8 created by the Language Processor 6 (step 20). The sequence begins with the source code 10 in the object oriented language-based development environment being accessed by the Language Processor 6. The Language Processor then examines the source code 10 (step 22). The Language Processor 6 then creates the parse tree 8 (step 24). As previously noted, the parse tree data structure 8 is represented as a class from which different tree objects are later instantiated (step 26). Each tree object includes the attributes and methods specified in the class definition and discussed above.

When there are several classes all using the invention, it is necessary to define several functions called Assign. This process is called overloading, and is known to those skilled in the art. The invention works slightly differently in this case depending on the characteristics of the Base Language. When operators are overloaded in the Base Language, then every expression has a known class associated with it. In this case, the choice of the appropriate Assign function is determined by the class of the expression represented by the Tree that is its second argument. (In some Base Languages, the order of the two arguments to the Assign function may be interchanged to make this fit more naturally into the rules for overloading).

Figure 3:
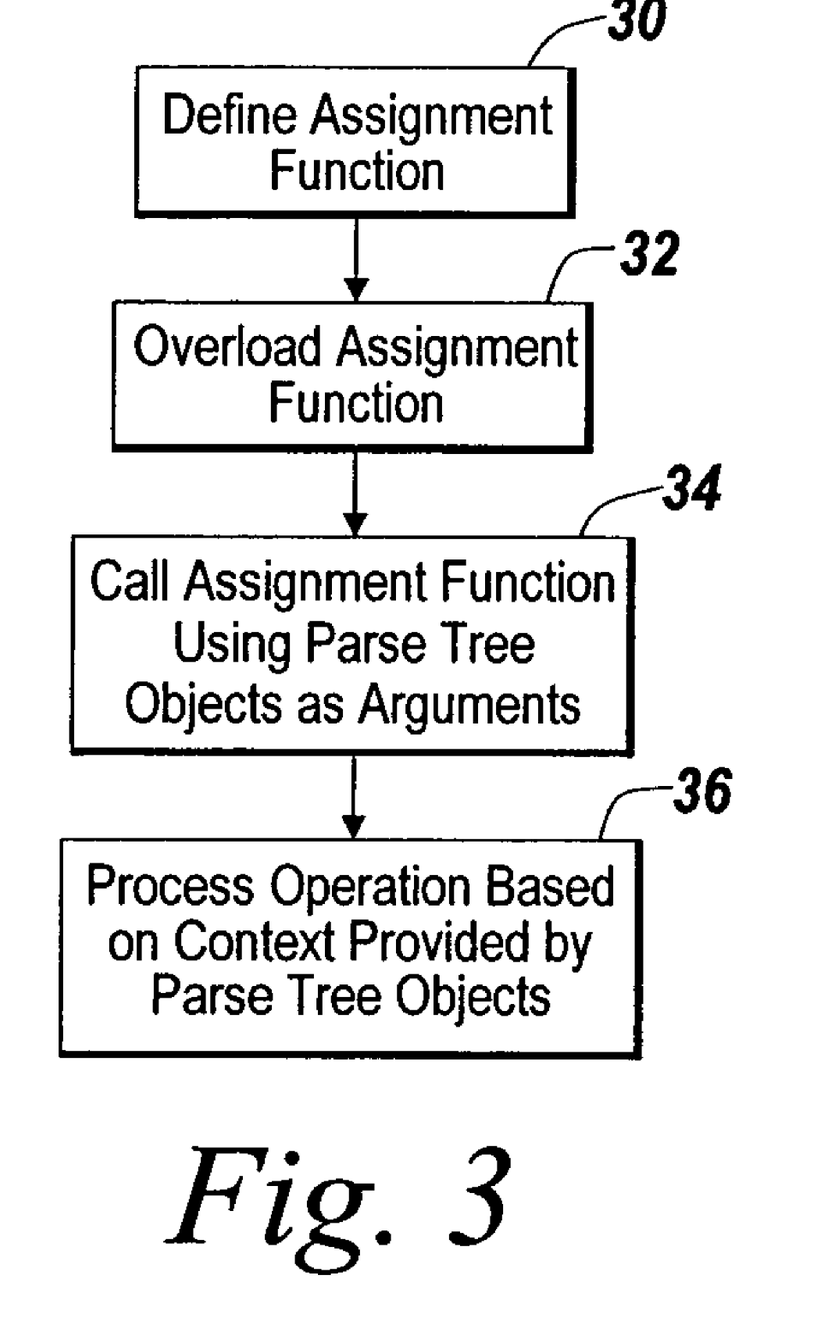
FIG. 3 is a flowchart of the sequence of steps followed by the illustrative embodiment of the present invention to define and use an assignment function.

FIG. 3 depicts the sequence of steps followed by the illustrative embodiment of the present invention to define and overload an assignment function (e.g.: the Assign function discussed above) in order to determine operator context. The sequence begins when the class designer defines an assignment function (step 30). The class designer may then optionally overload the evaluation function by defining the assignment function in different classes (step 32). The class designer then writes the assignment function that uses the parse tree objects as arguments (step 34). The overloaded assignment function then allows the operation to be processed based upon the particular class being assigned to (step 36). This invention thus specifically addresses those cases where some of the behavior desired by the Designer is the overloading of arithmetic and other types of operators.

Some of the uses of the present invention may be illustrated by reference to the following examples.

Example 1

In-Place Operations

The objects in class C may take up a large amount of memory. For example, the objects may be large matrices containing thousands of elements. Certain kinds of arithmetic on these objects may be done "in place". For example, an expression such as

A=A+1 may be computed by adding 1 to each element of A. In conventional operator overloading, however, it is not possible to recognize this important optimization. The above expression would conventionally be evaluated by 1. Creating a temporary object—T.
2. Computing the value of A+1 into T.
3. Freeing the old object A.
4. Renaming T to A.

The process of object allocation and freeing adds significant overhead to this operation, and doubles the amount of memory needed to carry out this operation. Using the present invention, it is possible to recognize in-place operations. Then a call Assign(t1, t2)

to the Assign function would operate as follows:

1. The kind of the top node of t2 would be examined to see if it supported in-place operations.
2. If so, the left operand of t2 would be examined to see whether it matched t1.
3. If so, the in-place operation would be done.
4. Otherwise, the more traditional operation would be done.

Depending on the base language, there may be other conditions that need to be met before the in-place operation could be safely used, but such tests are easily coded. It should be noted that in many cases steps 1 and 2 could be done by the Language Processor by looking at the trees only once, when the class description was processed. When this is possible, the in-place operation can become a "compile-time optimization". In effect, the invention serves to extend the compiler optimizations, leading to faster, smaller run-time code. In other cases, the tests may be performed at run time, but may still represent a significant optimization opportunity.

Figure 4:
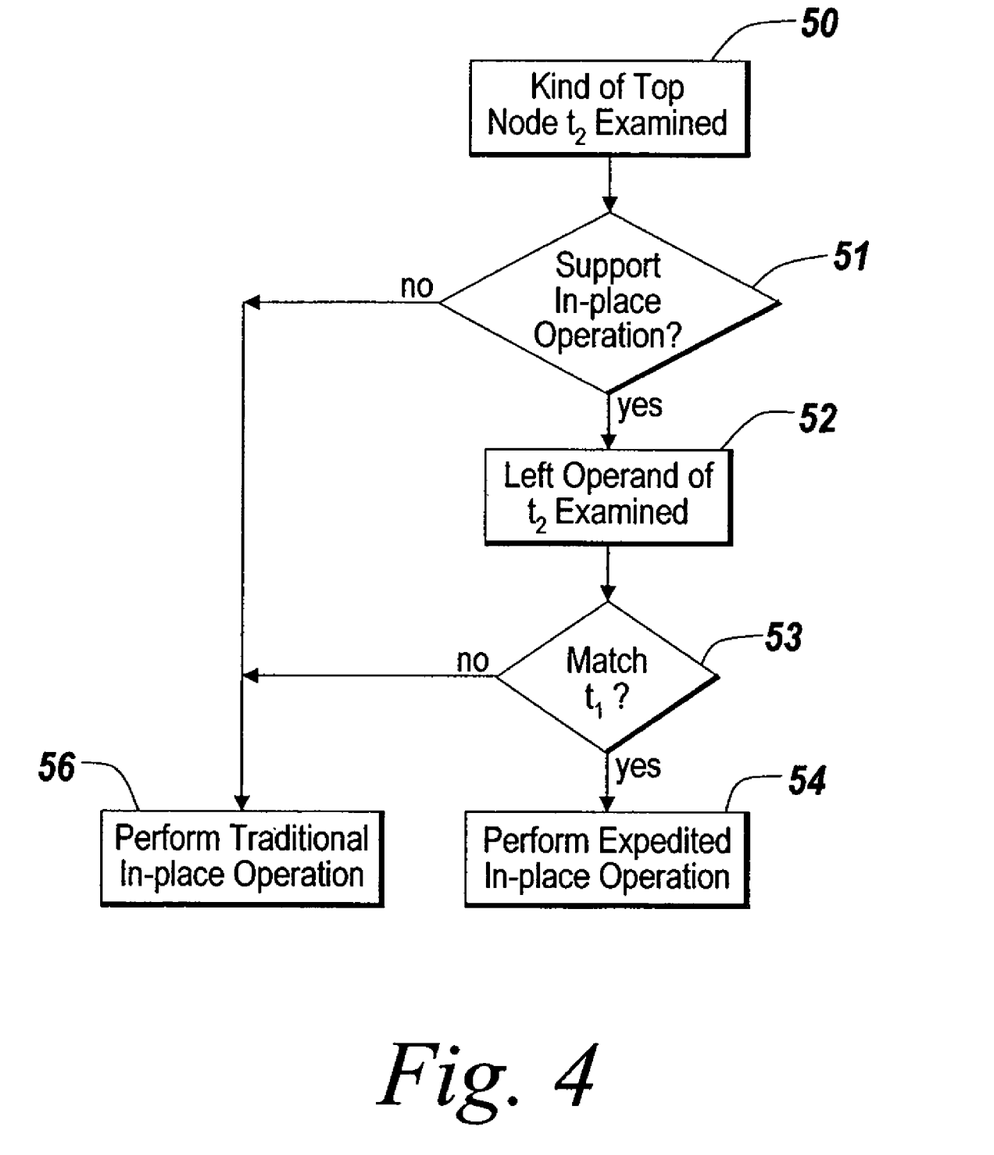
FIG. 4 is a flowchart of the sequence of steps followed by the illustrative embodiment of the present invention to determine whether streamlined in-place operations can be performed.

FIG. 4 depicts the sequence of steps followed by the illustrative embodiment of the present invention to determine whether expedited in-place operations may be performed. The sequence begins with the kind of the top node of t2 being examined (step 50) to see if it supports in-place operations (step 51). If the top node of t2 does support in-place operations (step 51), the left operand of t2 is examined (step 52) to see if it matches t1 (step 53). If the left operand of t2 does match t1, the expedited in-place operation described above is performed (step 54). Otherwise, the traditional form of in-place operation is performed (step 56).

Example 2

Methods that Look Like Properties

A classic example in object-oriented language textbooks is an object, Pt, that represents a point. It has two properties, x and y, that represent the coordinates of the point. It also has two methods, r and theta, which represent the polar coordinates of the point. So if p is an object of class Pt, p.x p.y p.r( )

p.theta( )

may be used to obtain the values of x, y, r, and theta for p. This appears asymmetric to a user viewing the code, so often the properties are given hidden names, and methods are supplied to access x and y as well as r and theta. To set the x, y, r and theta values, four additional methods, setx, sety, etc. are needed to allow the setting of each of these parameters in turn. This is a cumbersome and inefficient way to process simple points.

Using the methodology of the present invention, it is now possible to allow a user to set each of these values using the natural "dot" notation, but still have all of the advantages of hiding the underlying implementation. An Assign function is defined that looks at the left side tree to see if the root node is DOT. If so, it looks at the property name and calls the appropriate set method for x, y, r, or theta. Similarly, on the right-hand side, Assign looks for a dot and calls the appropriate method to obtain the property. This type of use of the Assign function raises an issue. The value being assigned is not a Pt object, but rather a coordinate or angle. The way to manage this is to make the coordinates and angles members of a class derived from the built-in class that holds the coordinate values (for example, a defined class Coord derived from the built-in class double). Then the Assign function is actually defined for values of class Coord rather than Pt.

Example 3

Detailed Version of Previous Example

The definition of the Assign function for Coords, as described in the previous example may be represented as follows using a language similar to C++ as the Base Language:

```
void Coord:Assign(Tree t1, Tree t2
{
Coord temp;
switch(kind(t2))
{
case DOT:
   if(right(t2).isname("x"))
   {
      temp=Val(left(t2)).get_x( );
      break;
   }
   similarly with y, r, and theta
default:
   temp=Val(t2);
   break;
}
/* at this point, temp is defined */
switch(kind(t1))
{
case DOT:
   if(right(t1).isname("x"))
   {
      Val(left(t1)).set_x(temp);
      break;
   }
   similarly with y, r, and theta
default:
   Assign(t2, temp);
}
}
```

Much of the above logic may be carried out at "compile time", thus leading to efficient output code.

Example 4

Constraining Evaluation Order

Another application of the invention allows class designers to enforce a particular order of evaluation on overloaded operators. For example, in a statement like

X=A+B+C;

most languages do not make any guarantees about the order of evaluation of the right hand side—whether A is first added to B, and then the result is added to C, or whether B and C are added together and then A is added to that sum. The class designer can enforce an order of evaluation of the operands of an overloaded operator by using the Assign function. By first evaluating the left operand of an operator and then the right, it is possible to enforce left-to-right evaluation—by evaluating the right operand first, it is possible to force right-to-left evaluation.

The illustrative embodiment of the present invention may also be used to write code for an embedded processor. Because the illustrative embodiment of the present invention enables the context in which operations are occurring, the present invention is particularly useful when simulating the behavior of computers with unusual instructions and word lengths and in processing MAC type instructions. As a result of the ability to generate code for embedded processors and to optimize the code based on the context of operations, the illustrative embodiment of the present invention has application to DSP, Microcontrollers, general purpose processors, FPGAs (Field Programmable Gate Arrays) and processor emulation.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequences of steps utilized in the illustrative flowcharts are examples and not the exclusive sequence of steps possible within the scope of the present invention.

We claim:

1. In a program development environment, a computer implemented method comprising:
   providing, via a programming language, a language processor with built-in support for a parse tree data structure written in a base language, said parse tree data structure represented as a class, said class being a basis for a plurality of parse tree objects, said parse tree objects including methods that retrieve values for base language objects;
   defining an assignment function, said assignment function taking a plurality of parse tree structures as arguments;
   defining said assignment function in more than one class, wherein said assignment function is used to identify in-place operations by examining a type of operator at a root of said parse tree structures;
   overloading said assignment function based on a context of said base language objects; and
   calling said assignment function from said language processor to determine a value of at least one assignment within at least one of said base language and a base language extension to said base language.

2. The method of claim 1 wherein said assignment function overloads a mathematical operator.

3. The method of claim 1, further comprising:
   evaluating said class at compile-time, and
   adjusting said resulting class definitions from said evaluation to increase efficiency of run-time performance.

4. The method of claim 1, further comprising:
   overloading a mathematical operator with said assignment function to alter a sequence of evaluation of operands usually followed in said programming language, said overloading designating an order of operand evaluation.

5. The method of claim 1, further comprising:
   calling a method in said parse tree objects to determine a type of operator at a root of said parse tree data structure.

6. The method of claim 1, further comprising:
   calling a method in said parse tree objects to retrieve one of an associated left and right tree.

7. The method of claim 1 wherein a root of said parse tree data structure is one of a constant, variable, a mathematical symbol and a mathematical expression.

8. The method of claim 1 wherein said assignment function is not explicitly defined.

9. The method of claim 1 wherein said assignment function is used to identify and perform multiply and accumulate ("MAC") operations.

10. The method of claim 1 wherein said base language is one of C++, JAVA, System-C, VERILOG, Verilog, C#, IDL, MATLAB and a language based on the Net framework.

11. In a program development environment, a computer implemented method comprising:
   providing, via a programming language, a language processor with built-in support for a parse tree data structure written in a base language, said parse tree data structure represented as a class, said class being a basis for a plurality of parse tree objects, said parse tree objects including parse tree object methods that retrieve values for base language objects;
   defining an assignment function, said assignment function taking a plurality of parse tree structures as arguments;
   defining said assignment function in more than one class, wherein said assignment function is used to identify in-place operations by examining a type of operator at a root of said parse tree structures;
   overloading said assignment function based on a context of said base language objects said context determined from one of said parse tree object methods;
   calling said assignment function from said language processor to determine a value of at least one assignment within at least one of the said base language and a base language extension for said base language; and
   generating code for an embedded processor using said parse tree data structure.

12. In a program development environment, a computer implemented method comprising:
   providing, via a programming language, a language processor with built-in support for a parse tree data structure written in a base language, said parse tree data structure represented as a class, said class being a basis for a plurality of parse tree objects, said parse tree objects including methods that retrieve values for base language objects;
   defining an assignment function, said assignment function taking a plurality of parse tree structures as arguments;
   defining said assignment function in more than one class, wherein said assignment function is used to identify in-place operations by examining a type of operator at a root of said parse tree structures;
   overloading said assignment function based on a context of said base language objects;
   calling said assignment function from said language processor to determine a value of at least one assignment within at least one of the base language and a base language extension for said base language; and
   using said parse tree data structure in software emulation.

13. A computer-readable storage medium for storing computer executable instructions for use in a program development environment, said instructions comprising:
   one or more instructions for providing a programming language;
   one or more instructions for providing a language processor via said programming language, said language processor having built-in support for a parse tree data structure written in a base language, said parse tree data structure represented as a class, said class being a basis for a plurality of parse tree objects, said parse tree objects including parse tree object methods that retrieve values for base language objects;
   one or more instructions for defining an assignment function, said assignment function taking a plurality of parse tree structures as arguments;
   one or more instructions for defining said assignment function in more than one class, wherein said assignment function is used to identify in-place operations by examining a type of operator at a root of said parse tree structures;
   one or more instructions for overloading said assignment function based on a context of said base language objects, said context determined from one of said parse tree object methods; and
   one or more instructions for calling said assignment function from said language processor to determine a value of at least one assignment within at least one of said base language and a base language extension to said base language.

14. The medium of claim 13 wherein said assignment function overloads a mathematical operator.

15. The medium of claim 13 wherein said overloading of said assignment function is based on a context of said base language objects.

16. The medium of claim 13, wherein said instructions further comprise:
   one or more instructions for evaluating said class at compile-time, and
   one or more instructions for adjusting said resulting class definitions from said evaluation to increase efficiency of run-time performance.

17. The medium of claim 13, wherein said instructions further comprise:
   one or more instructions for overloading a mathematical operator with said assignment function to alter a sequence of evaluation of operands usually followed in said programming language, said overloading designating an order of operand evaluation.

18. The medium of claim 13, wherein said instructions further comprise: one or more instructions for calling a method in said parse tree to determine a type of operator at a root of said parse tree data structure.

19. The medium of claim 13, wherein said instructions further comprise one or more instructions for calling a method in said parse tree object to retrieve one of an associated left and right tree.

20. The medium of claim 13 wherein a root of said parse tree data structure is one of a constant, variable, a mathematical symbol and a mathematical expression.

21. The medium of claim 13 wherein said assignment function is not explicitly defined.

22. The medium of claim 16 wherein said assignment function is used to identify and perform multiply and accumulate ("MAC") operations.

23. The medium of claim 13 wherein said base language is one of C++, JAVA, System-C, VHDL, Verilog, C#, IDL, MATLAB and a language based on the .Net framework.

24. The medium of claim 13 wherein said parse tree data structure is used to generate code for an embedded processor.

25. The medium of claim 13 wherein said parse tree data structure is used in processor emulation.

26. A computer-readable storage medium for storing computer executable instructions for use in a program development environment, said instructions comprising:
   one or more instructions for providing a programming language;
   one or more instructions for providing a language processor via said programming language, said language processor having built-in support for a parse tree data structure written in a base language, said parse tree data structure represented as a class, said class being a basis for a plurality of parse tree objects, said parse tree objects including methods that retrieve values for base language objects;

one or more instructions for defining an assignment function, said assignment function taking a plurality of parse tree structures as arguments;

one or more instructions for defining said assignment function in more than one class, wherein said assignment function is used to identify in-place operations by examining a type of operator at a root of said parse tree structures;

one or more instructions for overloading said assignment function based on a context of said base language objects;

one or more instructions for calling said assignment function from said language processor to determine a value of at least one assignment within at least one of said base language and a base language extension to said base language; and one or more instructions for generating code for an embedded processor using said parse tree data structure.

27. A computer-readable storage medium for storing computer executable instructions for use in a program development environment, said instructions comprising:

one or more instructions for providing a programming language;

one or more instructions for providing a language processor via said programming language, said language processor having built-in support for a parse tree data structure written in a base language, said parse tree data structure represented as a class, said class being a basis for a plurality of parse tree objects, said parse tree objects including methods that retrieve-values for base language objects;

one or more instructions for defining an assignment function, said assignment function taking a plurality of parse tree structures as arguments;

one or more instructions for defining said assignment function in more than one class, wherein said assignment function is used to identify in-place operations by examining a type of operator at a root of said parse tree structures;

one or more instructions for overloading said assignment function based on a context of said base language objects;

one or more instructions for calling said assignment function from said language processor to determine a value of at least one assignment within at least one of said base language and a base language extension to said base language; and one or more instructions for using said parse tree data structure in software emulation.

28. In an object-oriented program development environment having a base language, a computer implemented method comprising:

providing a programming language;

providing a language processor via said programming language, said language processor having built-in support for a parse tree data structure in said object-oriented program development environment, said parse tree data structure used as a basis for at least one parse tree object, said parse tree objects including methods that retrieve values for base language objects;

defining an assignment function taking a plurality of parse tree structures as arguments in more than one class, wherein said assignment function is used to identify in-place operations by examining a type of operator at a root of said parse tree structures;

calling said assignment function from said language processor to determine a value of at least one assignment within at least one of a base language and a base language extension; and overloading a mathematical operator with said assignment function based on a context of a plurality of said base language objects.

* * * * *

UNITED STATES PATENT AND TRADEMARK OFFICE
CERTIFICATE OF CORRECTION

| | |
|---|---|
| PATENT NO. | : 7,636,914 B1 |
| APPLICATION NO. | : 10/692524 |
| DATED | : December 22, 2009 |
| INVENTOR(S) | : Steve Johnson |

It is certified that error appears in the above-identified patent and that said Letters Patent is hereby corrected as shown below:

At column 9, line 2 (claim 10, line 2) of the printed patent, please insert --VHDL,-- before VERILOG.

At column 9, line 2 (claim 10, line 2) of the printed patent, please delete "Verilog" before C#.

At column 10, line 34 (claim 18, line 3) of the printed patent, please insert --objects-- before to.

At column 10, line 49 (claim 23, line 2) of the printed patent, please change "Verilog" to --VERILOG--.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,636,914 B1 | Page 1 of 1 |
| APPLICATION NO. | : 10/692524 | |
| DATED | : December 22, 2009 | |
| INVENTOR(S) | : Steve Johnson | |

It is certified that error appears in the above-identified patent and that said Letters Patent is hereby corrected as shown below:

On the Title Page, Item (73) Assignee, replace "The Math Works, Inc." with --The MathWorks, Inc.--.

Signed and Sealed this
Eighteenth Day of November, 2014

Michelle K. Lee
*Deputy Director of the United States Patent and Trademark Office*